US012657601B2

(12) United States Patent      (10) Patent No.:   US 12,657,601 B2

Mancilla      (45) Date of Patent:    Jun. 16, 2026

(54) METHOD OF REAL-TIME LOYALTY REWARDS REDEMPTION

(71) Applicant: American Express Travel Related Services Company, Inc., New York, NY (US)

(72) Inventor: Edson Mancilla, Los Angeles, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 120 days.

(21) Appl. No.: 18/092,765

(22) Filed: Jan. 3, 2023

(65) Prior Publication Data

US 2024/0221021 A1     Jul. 4, 2024

(51) Int. Cl.
| | |
|---|---|
| *G06Q 30/0226* | (2023.01) |
| *G06Q 20/02* | (2012.01) |
| *G06Q 20/10* | (2012.01) |
| *G06Q 20/36* | (2012.01) |
| *G06Q 20/38* | (2012.01) |

(52) U.S. Cl.
CPC ......... *G06Q 30/0233* (2013.01); *G06Q 20/02* (2013.01); *G06Q 20/10* (2013.01); *G06Q 20/3678* (2013.01); *G06Q 20/381* (2013.01); *G06Q 2220/00* (2013.01)

(58) Field of Classification Search
CPC .... G06Q 30/0233; G06Q 20/02; G06Q 20/10; G06Q 20/3678; G06Q 20/381; G06Q 2220/00
See application file for complete search history.

(56) References Cited

U.S. PATENT DOCUMENTS

| | | | | |
|---|---|---|---|---|
| 2017/0200184 A1* | 7/2017 | Tschida | ............... | G06Q 30/0233 |
| 2020/0065847 A1* | 2/2020 | Harrison | .............. | G06Q 20/367 |
| 2021/0117962 A1* | 4/2021 | Ortiz | ..................... | H04L 9/0637 |
| 2021/0184850 A1* | 6/2021 | Shpurov | .............. | H04L 9/3247 |
| 2024/0021046 A1* | 1/2024 | Upadrasta | ............ | G06Q 20/065 |

* cited by examiner

*Primary Examiner* — Davida Lee King

(74) *Attorney, Agent, or Firm* — STERNE, KESSLER, GOLDSTEIN & FOX P.L.L.C.

(57) ABSTRACT

Disclosed herein are method, computer program product, and system embodiments for real-time loyalty rewards redemption. A user may earn rewards in a rewards system that have an equivalent value to a digital asset such as a cryptocurrency asset (e.g., Bitcoin, Ethereum, etc.), crypto tokens (e.g., ERC-20, Dogecoin, etc.), and/or the like. A user device (e.g., mobile device, smart device, etc.) may request to redeem the rewards value in the form of the digital asset, initiating transfer of the digital asset from an asset management system to a digital wallet of the user device. The transfer of the digital asset from the asset management system to the digital wallet of the user device happens in real-time. After the digital asset is transferred to the user device, it may be exchanged for monetary value via a third party redemption service or used as payment.

20 Claims, 3 Drawing Sheets

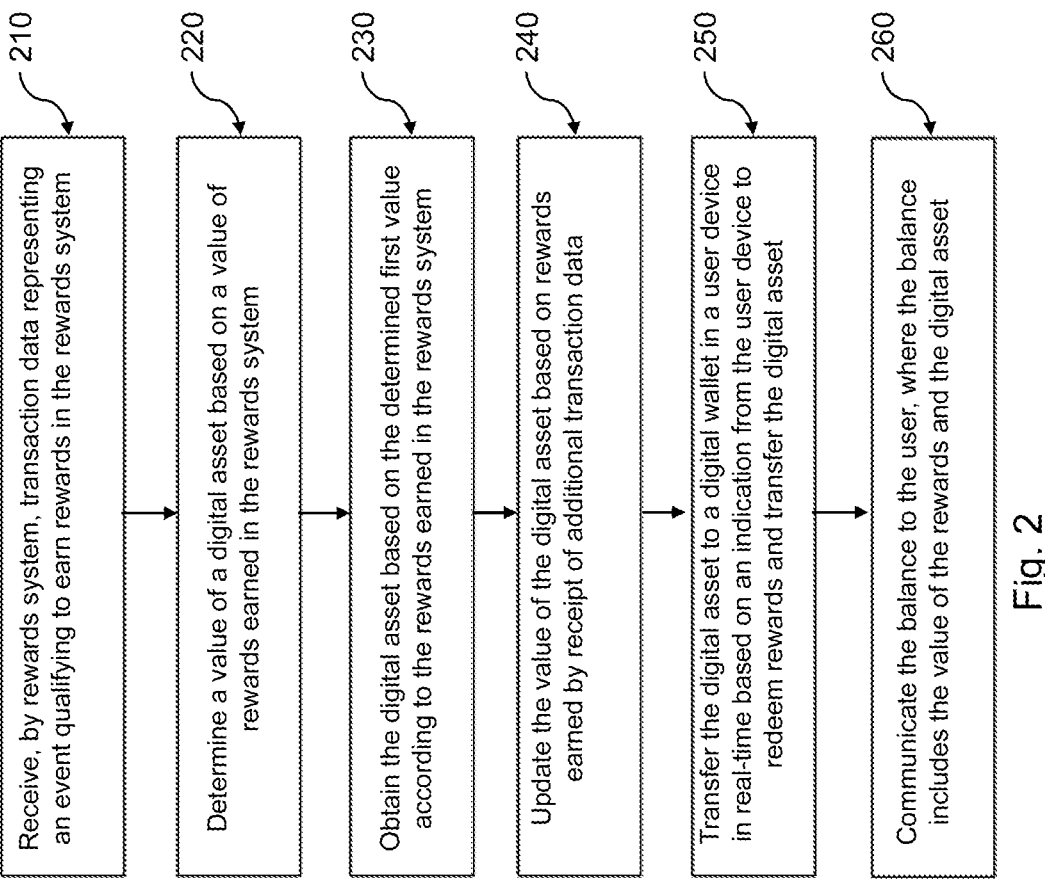

200

210 Receive, by rewards system, transaction data representing an event qualifying to earn rewards in the rewards system 220 Determine a value of a digital asset based on a value of rewards earned in the rewards system 230 Obtain the digital asset based on the determined first value according to the rewards earned in the rewards system 240 Update the value of the digital asset based on rewards earned by receipt of additional transaction data 250 Transfer the digital asset to a digital wallet in a user device in real-time based on an indication from the user device to redeem rewards and transfer the digital asset 260 Communicate the balance to the user, where the balance includes the value of the rewards and the digital asset

Fig. 2

METHOD OF REAL-TIME LOYALTY REWARDS REDEMPTION

BACKGROUND

Loyalty rewards systems provide the opportunity for users to accumulate rewards points. One way to earn reward points is to complete events, such as making a qualifying purchase. The accumulated rewards points can be exchanged for a number of benefits including cashing out the points for their monetary value. When cashing out the points, money can be transferred to a user through an Automated Clearing House (ACH) payment.

Typically, an ACH payment may take between three and five days to process before the user obtains the currency from the loyalty rewards redemption in their account. This may deter a user from pursuing the redemption of rewards through this method even though it may be their preferred method of exchange.

SUMMARY

Embodiments of the present disclosure include a method for earning rewards in a rewards system. The earned rewards have a value equivalent to a digital asset, and the digital asset can be transferred in real-time to a user device upon request. In the method, transaction data is received by the rewards system. In the reward system, rewards are continuously updated based on receipt of additional transaction data. A digital asset of an equivalent value is obtained through an asset management system. In response to a change in the current value of the rewards, a value of the digital asset is updated. When the rewards system and the asset management system receive redemption and transfer requests, the digital asset is transferred, in real-time, to a user device. Finally, the value of the digital asset is communicated to the user such that the user may exchange the digital asset for a monetary value.

Provided herein are system, apparatus, article of manufacture, method and/or computer program product embodiments, and/or combinations and sub-combinations thereof, for allowing an account holder to authorize an entity to issue pull requests for real-time loyalty rewards redemption.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

FIG. 2 shows an example of a method of real-time loyalty rewards redemption, according to aspects of this disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for real-time loyalty rewards redemption. Rewards system may accrue rewards of a corresponding value to a digital asset that can be transferred to a user device (e.g., mobile devices, smart devices, etc.) in real-time, using ad hoc networks to transfer digital assets from an asset management system to a user device. The value of the digital asset may be updated as a user continues to earn rewards in the rewards system. When rewards are redeemed in the rewards system, the digital asset may be transferred directly to the user device at the time of the request. This allows the user to have access to the value of the rewards in real-time, rather than waiting possibly several days to exchange points for cash. According to aspects of this disclosure, the digital asset may be a cryptocurrency asset which may be transferred from the asset management system to the user device in real-time upon a redemption request.

Figure 1:
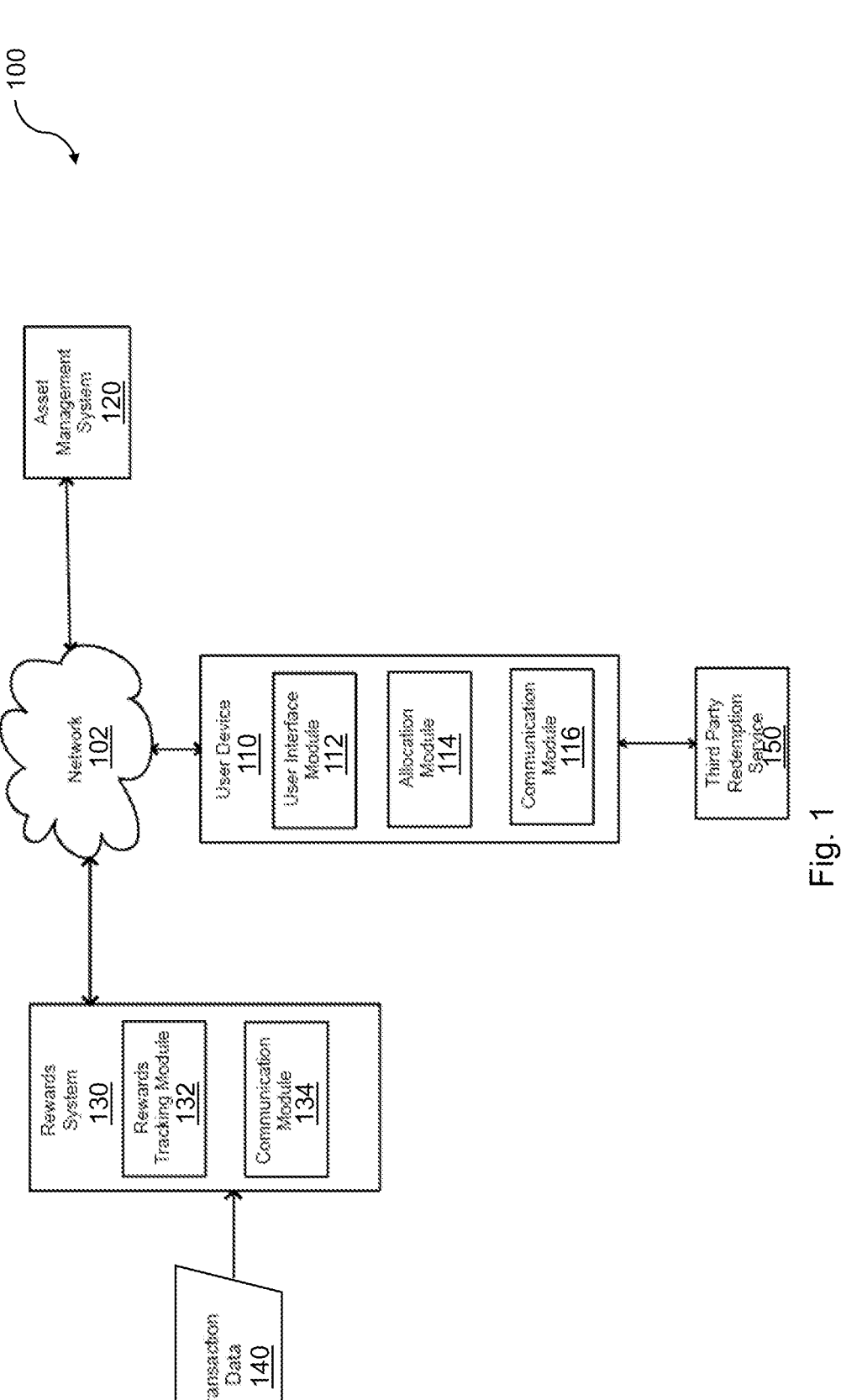
FIG. 1 is a block diagram of an example system for real-time loyalty rewards redemption, according to aspects of this disclosure.

FIG. 1 shows an example system 100 for real-time loyalty rewards redemption. System 100 is merely an example of one suitable system environment and is not intended to suggest any limitation as to the scope of use or functionality of aspects described herein. System 100 should not be interpreted as having any dependency or requirement related to any single device/module/component or combination of devices/modules/components described therein.

System 100 includes reward system 130, network 102, user device 110, third party redemption service 150, and asset management system 120. Each of these products will be described in turn.

Rewards system 130 is a computer system that tracks user activity for the purpose of calculating rewards and maintaining a balance of rewards points. Rewards system 130 includes a rewards tracking module 132 and a communication module 134.

Rewards tracking module 132 may be activated and/or initiated in response to receiving transaction data 140 indicating a qualifying event was completed. Transaction data 140 indicates that a transaction is eligible to earn rewards was completed. Based on transaction data 140, rewards tracking module 132 calculates earned rewards according to qualifying criteria of rewards system 130. Rewards tracking module 132 may notify communication module 134 that the earned rewards have been updated.

When communication module 134 receives an updated value for the earned rewards, communication module 134 instructs asset management system 120, through network 102, to acquire a digital asset of a certain value.

This process continues as rewards system 130 receives new transaction data 140. In particular, as rewards system 130 receives additional transaction data 140, rewards tracking module 132 updates the current value of a user's rewards. Communication module 134 will continue to instruct asset management system 120 to acquire digital assets equivalent to the current value of rewards as calculated by rewards tracking module 132. As the rewards value is continuously updated based on transaction data 140, the digital asset may be a whole or fractionized portion of a unit of cryptocurrency.

As mentioned above, communication module 134 sends instruction to asset management system 120 to obtain digital assets. For example, such an instruction from communication module 134 may specify the timing of when to obtain a digital asset, a type of digital asset to obtain, and an amount, whole or fractionized, to obtain. Communication module 134 may also communicate directly with user device 110. For example, communication module 134 may indicate the amount of the rewards to be displayed in user interface module 112 of user device 110.

Communication between the various components may take place over network 102. Network 102 may include a packet-switched network (e.g., internet protocol-based network), a non-packet switched network (e.g., quadrature amplitude modulation-based network), and/or the like. Network 102 may include network adapters, switches, routers, modems, and the like connected through wireless links (e.g., radiofrequency, satellite) and/or physical links (e.g., fiber optic cable, coaxial cable, Ethernet cable, or a combination thereof). Network 102 may include public networks, private networks, wide area networks (e.g., Internet), local area networks, and/or the like. Network 102 may provide and/or support communication from a telephone, cellular phone, modem, and/or other electronic devices to and throughout the system 100. For example, system 100 may include and support communications between user device 110 and an asset management system 120 via network 102.

Asset management system 120 may enable purchase and sale of digital assets, such as a crypto coin or token or another digital asset. For example, asset management system 120 may maintain a digital wallet and a wallet identifier associated with either the user or with rewards system 130. In this way, Asset management system 120 may have the ability to write to a blockchain distributed ledger.

In addition to being able to write to a blockchain ledger, asset management system 120 may have the ability to transfer a digital asset to user device 110 that may provide, facilitate, and/or support one or more applications, and/or protocols, such as AMEX PAY®, and the like. User device 110 may be configured to communicate with asset management system 120 to transfer digital assets. For example, the transfer message may be in response to a message from rewards system 130 indicating that a user would like to redeem loyalty rewards earned in rewards system 130. User device 110 may be configured with an application and/or an application programming interface (API) that includes services, libraries, code, a combination thereof, and/or the like. The application and/or the API may enable user device 110 to communicate with rewards system 130 and asset management system 120 to request that rewards be redeemed and that a corresponding digital asset be transferred to a user. For example, communication module 116, of user device 110, may send a redemption request to rewards system 130. In response, communication module 134, of rewards system 130, will send a transfer message to asset management system 120 indicating the digital asset should be transferred to the digital wallet of the user device 110. The digital asset will then be transferred to user device 110 in real-time.

As mentioned above, asset management system 120 may write to a blockchain ledger. The blockchain may be a distributed database that maintains records in a readable manner and that is resistant to tampering. The blockchain may include a system of interconnected blocks containing data. The blocks can hold transfer data, smart contract data, and/or other information (e.g., digital assets, cryptocurrency assets, etc.) as desired. Each block may link to the previous block and may include a timestamp. When implemented in support of asset management system 120, the blockchain may serve as an immutable log for API transactions and related communications. The blockchain may be a peer-to-peer network that is private, consortium, and/or public (e.g., Ethereum, Bitcoin, etc.). Consortium and private networks may offer improved control over the content of the blockchain and public networks (e.g., network 102, etc.) may leverage the cumulative computing power of the network to improve security. The blockchain may be implemented using technologies, for example, Ethereum GETH, eth-light wallet, or other suitable blockchain interface technologies. The blockchain may be maintained on various nodes in the form of copies of the blockchain. Validation of API transactions may be added to the blockchain by establishing consensus between the nodes based on proof of work, proof of stake, practical byzantine fault tolerance, delegated proof of stake, or other suitable consensus algorithms.

User device 110 may include a smart device, a mobile device, a computing device, and/or any other device capable of communicating with network 102 and/or device/components in communication with network 102.

User device 110 may include a user interface module 112. User interface module 112 enables a user to interact with user device 110, network 102, asset management system 120, rewards system 130, transaction data 140, third party redemption service 150, and/or any other device/component of the system 100. User interface module 112 may include any interface for presenting and/or receiving information to/from a user.

User interface module 112 may include a web browser, a user interface of an application (e.g., AMEX PAY®, etc.), and/or the like. Other software, hardware, and/or interfaces can be used to provide communication between network 102, user device 110, asset management system 120, transaction data 140, third party redemption service 150 and/or any other device/component of the system 100.

User interface module 112 may include one or more input devices and/or components, for example, such as a keyboard, a pointing device (e.g., a computer mouse, remote control), a microphone, a joystick, a tactile input device (e.g., touch screen, gloves, etc.), and/or the like. Input devices and/or components of user interface module 112 may include hardware input devices and/or components, software input devices and/or components, virtual input devices and/or components, physical input devices and/or components, and/or the like. Interaction with the input device and/or components may enable a user to view, access, request, and/or navigate a user interface generated, accessible, and/or displayed by user interface module 112. Interaction with the input devices and/or components may enable a user to manipulate and/or interact with components of a user interface, for example, to check rewards value according to rewards system 130, to request transfer of digital asset to user device 110, to transfer digital asset to third party redemption service 150 in exchange for another currency, and/or the like.

User interface 110 receives messages from communication module 134 that indicate the current balance. User interface module 112 may display a current balance to the user. The current balance may include the balance of the rewards calculated by rewards tracking module 132 and the value of the digital asset being managed by asset management system 120.

User device 110 may include a communication module 116, that, like communication module 134 described above, enables communication with network 102 (e.g., devices, components, and/or systems of the network 102, etc.), asset management system 120 (e.g., devices, components, and/or systems of asset management system 120, etc.), third party redemption service 150, rewards system 130 and user device 110, respectively, and/or any other device/component of the system 100. Communication module 116 and communication module 134 may include any hardware and/or software necessary to facilitate communication including, but not limited to a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. For example, communication module 116 and communication module 134 may include multiple radio interfaces that support various wireless communication protocols and/or standards (e.g., Wi-Fi, BLUETOOTH™, LTE, LTE-A, Zig-Bee, Ant+, near field communications (NFC), UWB (Ultra-wideband), 3G, 4G, 5G, PCS, GSM, etc.). Accordingly, the UE may need to simultaneously operate multiple radio interfaces corresponding to multiple wireless communication protocols and/or standards. Communication module 116 and communication module 134 enable wireless, ad hoc, automatic, self-configuring high-speed networking.

Communication module 110 and rewards system 130 may use a communication protocol (e.g., Ultra-wideband (UWB), Wi-Fi Direct, peer-to-peer Wi-Fi, Nearby Share, Multipeer Connectivity, infrared, etc.) to facilitate ad hoc, and high-speed network between rewards system 130, user device 110, asset management system 120, and/or the like.

To manage asset transferal, user device 110 may include an allocation module 114. Allocation module 114 may be initiated, supported by, in communication with, and/or the like an application (e.g., AMEX PAY®, etc.) and/or the like configured with user device 110. Allocation module 114 may include and/or be associated with a digital wallet. The digital wallet may include payment information and passwords associated with the user device 110 (e.g., associated with a user of the user device 110). For example, the digital wallet may include a crypto wallet. Additionally, the digital wallet may include payment card information, the payment card may be associated with a primary account number (PAN). The PAN may be tokenized for security. The PAN associated with the user device 110 may be stored by asset management system 120 (e.g., a payment network configured with, supported by, and/or enabled by asset management system 120, etc.) in a database record linked to a payment account (and/or user profile) associated with a user (e.g., a user associated with and/or using the user device 110, etc.). The payment account may be maintained/controlled by asset management system 120 (e.g., via an entity of asset management system 120, AMEX PAY®, etc.).

As previously described, asset management system 120 may include and/or be part of a device/network associated with an institution that maintains digital assets, for example cryptocurrency assets. User device 110 may receive a digital asset in a digital wallet associated with user device 110. The exchange may be instantaneous so user device 110 receives the digital asset from asset management system 120 in their digital wallet in real-time upon request from user device 110 to asset management system 120. The digital asset in the digital wallet of user device 110 has a monetary value the user may choose to exchange with third party redemption service 150 to for monetary asset at any time. The digital asset may also be stored on user device 110 in the digital wallet and used to make purchases where the accepted currency is in the form of the digital asset stored in the digital wallet of user device 110.

Allocation module 114 may include and/or be associated with a digital wallet including a crypto wallet (e.g., software, hardware, and/or the like that enables user device 110 to store and use cryptocurrency, etc.). A crypto wallet enables transactions to occur with an identifier (such as a username) that can be associated with a public key address on a blockchain of asset management system 120. User device 110 may utilize a crypto wallet to send and/or receive cryptocurrency assets redeemed through earned rewards in rewards system 130. The crypto wallet can be used to store a user's public and private keys for accessing and using cryptocurrency. Cryptocurrencies (e.g., Bitcoin, Ethereum, etc.), crypto tokens (e.g., ERC-20, Dogecoin, etc.), and/or the like may be transferred between crypto wallets and/or crypto accounts associated with user device 110 and asset management system 120 and third party redemption service 150.

Allocation module 114 enables user device 110 to receive an asset from asset management system 120 based on an indication from communication module 116 to asset management system 120 that user would like to redeem rewards from rewards system 130 for the digital asset held in asset management system 120. Upon redemption, digital asset would be transferred from asset management system 120 to user device 110 and held in allocation module 114 which may include a digital wallet associated with a crypto wallet. User interface module 112 may include capability for user to select automatic redemption of any rewards earned, which includes that automatic transfer of the digital asset held in asset management system 120 to user device 110 in allocation module 114. For example, the automatic transfer may be monthly, but can be a periodic automatic redemption and subsequent automatic transferal determined by user. If no rewards have been earned of an equivalent amount of a digital asset, then no transfer would occur for that time period. The value of any digital asset (e.g., cryptocurrencies and/or crypto tokens, fractional cryptocurrencies and/or crypto tokens, monetary assets, collateral items, personal identifiers and/or digital signatures, etc.) received by allocation module 114 may correspond to a value indicated by communication module 134 determined, calculated, and/or identified via rewards tracking module 132.

FIG. 2 shows a flowchart of an example method 200 for real-time loyalty rewards redemption. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the aspects of those figures.

In 210, rewards system 130 receives transaction data 140, and rewards tracking module 132 determines whether transaction data 140 qualifies to earn rewards, such as by representing an event qualified to earn rewards. Transaction data 140 may include transaction information from a merchant device (e.g., based on a near-field communication (NFC) transaction with a merchant POS device, based on a Bluetooth beacon from a merchant device, based on an email from a merchant device, etc.) and/or the like. Events qualifying to earn rewards may be specified by rewards module 132 and may include purchase events, percentage back rewards, spend thresholds, and/or the like.

In 220, rewards tracking module 132, in rewards system 130, uses transaction data received in step 210 to determine a first value for the digital asset. When rewards tracking module 132 determines that transaction data 140 qualifies to earn rewards, then rewards tracking module 132 may determine an equivalent value for a digital asset, whole or fractionized. To determine a first value for the digital asset, rewards tracking system 130 may receive enough transaction data 140 for rewards tracking module 132 to accrue enough rewards of an equivalent minimum first value for the digital asset. The equivalent minimum first value for the digital asset may be equivalent to a whole or fractionized portion of a digital asset. The digital asset may be a cryptocurrency asset (e.g., non-fungible tokens, cryptocurrencies, cryptocurrency tokens, etc.).

In 230, communication module 134 sends an instruction to asset management system to obtain a digital asset of the value determined by rewards tracking module in 220. Communication module 134 will instruct asset management system 120 to acquire a digital asset (e.g., non-fungible tokens, cryptocurrencies, cryptocurrency tokens, etc.). Once the digital asset is obtained, asset management system 120 may manage the asset. For example, communication module 134 may instruct asset management system 120 to obtain additional value of the digital asset or communication module 116 may request redemption/transfer of the digital asset to the user device 110. The digital asset obtained by asset management system 120 may have an equivalent monetary value such as a cryptocurrency asset (e.g., Bitcoin, Ethereum, etc.), crypto tokens (e.g., ERC-20, Dogecoin, etc.), and/or the like.

In 240, rewards tracking module 132 continues to receive transaction data 140 as events occur to earn eligible rewards. As transaction data 140 is received, rewards module 132 may continuously update the rewards value in rewards system 130. At various intervals while rewards tracking module 132 is tracking an increase in rewards value, communication module 134 may instruct asset management system 120 to obtain additional value of the digital asset. Due to the continuous earning of rewards in rewards system 130 and subsequent purchase of a corresponding value in a digital asset, the digital asset may be a whole or fractionized portion of a digital asset. For example, when the digital asset is a cryptocurrency asset, asset management system 120 may manage a whole/fractionized portion of non-fungible tokens, cryptocurrencies, cryptocurrency tokens, and/or the like.

In 250, user device 110 sends an instruction using communication module 116, to asset management system 120 to transfer the current digital asset to allocation module 114 of user device 110. Allocation module 114 may include a digital wallet including a crypto wallet (e.g., software, hardware, and/or the like that enables user device 110 to store and use cryptocurrency, etc.). The initiation and transfer of the digital asset to user device 110 from asset management system 120 is done in real-time. When transfer of the digital asset from asset management system 120 to user device 110 is completed, rewards system 130 may clear any rewards value that may have contributed to the digital asset transferred to user device 110.

In 260, user device 110 displays the value of the digital asset in user interface module 112. User device 110 may store digital asset in allocation module 114 which may include a digital wallet including a crypto wallet. If instructed, user device 110 may transfer digital asset in allocation module 114 to third party redemption service 150 in exchange for monetary value. For example, if the digital wallet is a cryptocurrency asset such as Bitcoin, the digital asset may be exchanged for monetary value with a Bitcoin broker.

Figure 3:
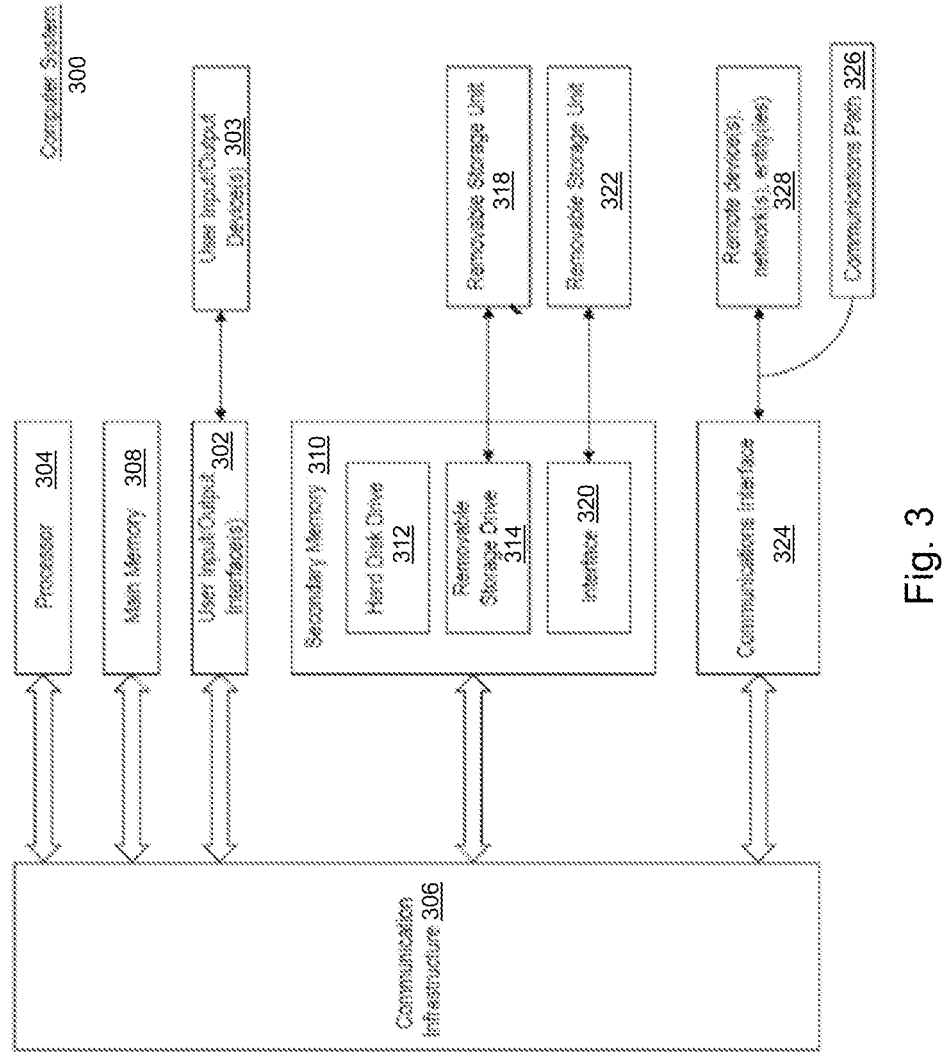
FIG. 3 is an example computer system useful for implementing various aspects of the disclosure.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as processor 304. Processor 304 may be connected to a bus or a communication infrastructure 306.

Computer system 300 may also include user input/output device(s) 303, such as monitors, keyboards, pointing devices, etc., which may communicate with a bus or communication infrastructure 306 user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or secondary memory 310. Secondary memory 310 may include, for example, a hard disk drive 312 and/or a drive or a removable storage device 314. Removable storage drive 314 may be a floppy disk drive, a magnetic tape drive, a compact disk drive, an optical storage device, a tape backup device, and/or any other storage device/drive.

Removable storage drive 314 may interact with a removable storage unit 318. The removable storage unit 318 may include a computer-usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to the removable storage unit 318.

Secondary memory 310 may include other means, devices, components, instrumentalities, and/or other approaches for allowing computer programs and/or other instructions and/or data to be accessed by computer system 300. Such means, devices, components, instrumentalities, and/or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communications interface 324 may enable computer system 300 to communicate and interact with any combination of external devices, external networks, external entities, etc. (individually and collectively referenced by reference number 328). For example, communications interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communications path 326.

Computer system 300 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning includes specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for real-time loyalty rewards redemption comprising:

receiving, by a rewards system, transaction data, wherein the transaction data represents an event that qualifies to earn rewards in the rewards system;

determining, by the rewards system, a value of a digital asset to obtain, wherein the value of the digital asset is calculated by the rewards system based on the rewards;

obtaining the digital asset from an asset management system based on a rewards value and the value of the digital asset determined by the rewards system;

updating, based on additional transaction data received by the rewards system, the rewards value;

in response to updating the rewards value, continuously updating the value of the digital asset according to the updated rewards value, wherein continuously updating the rewards value comprises linking a data structure of the rewards value to a data structure of the digital asset such that the updated rewards value updates the value of the digital asset in real-time;

receiving, by the rewards system and from a user device, a selection of a threshold value for redeeming the updated rewards value for the updated value of the digital asset;

based on the selection, enabling, by an allocation system, the user device to automatically receive the digital asset based on receiving a redemption request to the rewards system and based on a determination that the threshold value has been exceeded by the updated rewards value, wherein enabling the user device further comprises:

initializing a digital wallet by assigning an account identifier to the digital wallet, wherein the account identifier comprises a unique string of alphanumeric characters;

pairing the account identifier of the digital wallet with a public key address on a distributed ledger stored within the asset management system, wherein the distributed ledger is implemented over a private, public, or consortium peer-to-peer network; and storing the public key address within the digital wallet;

in response to receiving the redemption request to the rewards system, transferring the digital asset to the digital wallet of the user device in-real time, wherein the transferring further comprises writing transaction data of the redemption request to the distributed ledger using the public key address stored in the digital wallet and based on the determination that the threshold value has been exceeded by the updated rewards value; and communicating a balance to the user device, wherein the balance includes the rewards value and the value of the digital asset, wherein the user device is able to redeem the value of the digital asset, wherein a redemption of the rewards by the user device is a real-time exchange of the digital asset with a corresponding rewards value in the rewards system based on the determination the threshold value has been exceeded.

2. The method of claim 1, further comprising exchanging the value of the digital asset for a monetary value, wherein the exchange is facilitated by a third party redemption service.

3. The method of claim 1, wherein the digital asset is a cryptocurrency coin.

4. The method of claim 1, further comprising:

updating, based on the rewards value, the distributed ledger, wherein the digital asset is a cryptocurrency coin recorded on the distributed ledger, and wherein the distributed ledger is continuously updated as the rewards value is updated.

5. The method of claim 1, wherein the rewards in the rewards system are represented by a token, wherein the user device is configured to receive a whole or a portion of the token which corresponds to the digital asset.

6. The method of claim 1, wherein the rewards system is made up of reward tokens, wherein a value of one reward token is equivalent to one digital asset, wherein the one digital asset is configured to be transferred to the user device when a current reward value is equivalent to a full value of the digital asset.

7. The method of claim 1, wherein the digital asset is recorded on the distributed ledger.

8. The method of claim 1, wherein the digital asset is automatically transferred to the digital wallet of the user device when the value of the digital asset, based on the rewards value, reaches the threshold value.

9. The method of claim 1, wherein the digital asset is deposited in the digital wallet of the user device on a periodic basis.

10. A non-transitory computer-readable medium having instructions stored thereon that, when executed by at least one computing device, cause the at least one computing device to perform operations comprising:

receiving transaction data, wherein the transaction data represents an event which qualifies to earn rewards in a rewards system;

determining a value of a digital asset to obtain, wherein the value of the digital asset is calculated by the rewards system based on the rewards;

obtaining the digital asset from an asset management system based on a rewards value and the value of the digital asset determined by the rewards system;

updating, based on additional transaction data received by the rewards system, the rewards value;

in response to updating the rewards value, continuously updating the value of the digital asset according to the updated rewards value, wherein continuously updating the rewards value comprises linking a data structure of the rewards value to a data structure of the digital asset such that the updated rewards value updates the value of the digital asset in real-time;

receiving, by the rewards system and from a user device, a selection of a threshold value for redeeming the updated rewards value for the updated value of the digital asset;

based on the selection, enabling, by an allocation system, the user device to automatically receive the digital asset based on receiving a redemption request to the rewards system and based on a determination that the threshold value has been exceeded by the updated rewards value, wherein enabling the user device further comprises:

initializing a digital wallet by assigning an account identifier to the digital wallet, wherein the account identifier comprises a unique string of alphanumeric characters;

pairing the account identifier of the digital wallet with a public key address on a distributed ledger stored within the asset management system, wherein the distributed ledger is implemented over a private, public, or consortium peer-to-peer network; and storing the public key address within the digital wallet;

in response to receiving the redemption request to the rewards system, transferring the digital asset to the digital wallet of the user device in-real time, wherein the transferring further comprises writing transaction data of the redemption request to the distributed ledger using the public key address stored in the digital wallet based on the determination that the threshold value has been exceeded by the updated rewards value; and communicating a balance to the user device, wherein the balance includes the rewards value and the value of the digital asset, wherein the user device is able to redeem the value of the digital asset, wherein a redemption of the rewards by the user device is a real-time exchange of the digital asset to the digital wallet of the user device with a corresponding rewards value in the rewards system based on the determination the threshold value has been exceeded.

11. The non-transitory computer-readable medium of claim 10, further comprising an exchange of the value of the digital asset for a monetary value, wherein the exchange is facilitated by a third party redemption service.

12. The non-transitory computer-readable medium of claim 10, wherein the digital asset is a cryptocurrency coin.

13. The non-transitory computer-readable medium of claim 10, wherein the at least one computing device is further configured to perform operations comprising updating the distributed ledger based on the rewards value, wherein the digital asset is a cryptocurrency coin recorded on the distributed ledger, and wherein the distributed ledger is continuously updated as the rewards value is updated.

14. The non-transitory computer-readable medium of claim 10, wherein the rewards are represented by a token, wherein the user device is configured to receive a whole or a portion of the token which corresponds to the digital asset.

15. The non-transitory computer-readable medium of claim 10, wherein the rewards system is made up of rewards tokens, wherein a value of one rewards token is equivalent to one digital asset, wherein the one digital asset is configured to be transferred to the user device when a current reward value is equivalent to a full value of the digital asset.

16. The non-transitory computer-readable medium of claim 10, wherein the digital asset is recorded on the distributed ledge.

17. The non-transitory computer-readable medium of claim 10, wherein the digital asset is automatically transferred to the digital wallet of the user device when the value of the digital asset, based on the value of the rewards, reaches the threshold value.

18. The non-transitory computer-readable medium of claim 10, wherein the digital asset is transferred to the digital wallet of the user on a periodic basis.

19. A system comprising:
a processor;
a tangible, non-transitory memory configured to communicate with the processor; the tangible, non-transitory memory having instructions stored thereon that, in response to execution by the processor, cause the processor to perform operations comprising:
receiving, by a rewards system, transaction data, wherein the transaction data represents an event which qualifies to earn rewards in the rewards system;
determining, by the rewards system, a value of a digital asset to obtain, wherein the value of the digital asset is calculated by the rewards system based on the rewards;
obtaining the digital asset, based on a rewards value and the value of the digital asset determined by the rewards system;
updating, based on additional transaction data received by the rewards system, the rewards value;
in response to updating the rewards value, continuously updating the value of the digital asset according to the updated rewards value, wherein continuously updating the rewards value comprises linking a data structure of the rewards value to a data structure of the digital asset such that the updated rewards value updates the value of the digital asset in real-time;

receiving, by the rewards system and from a user device, a selection of a threshold value for redeeming the updated rewards value for the updated value of the digital asset;

based on the selection, enabling, by an allocation system, the user device to automatically receive the digital asset based on receiving a redemption request to the rewards system and based on a determination that the threshold value has been exceeded by the updated rewards value, wherein enabling the user device further comprises:

initializing a digital wallet by assigning an account identifier to the digital wallet, wherein the account identifier comprises a unique string of alphanumeric characters;

pairing the account identifier of the digital wallet with a public key address on a distributed ledger stored within an asset management system, wherein the distributed ledger is implemented over a private, public, or consortium peer-to-peer network; and storing the public key address within the digital wallet;

in response to receiving the redemption request to the rewards system, transferring the digital asset to the digital wallet of the user device in-real time, wherein the transferring further comprises writing transaction data of the redemption request to the distributed ledger using the public key address stored in the digital wallet based on the determination that the threshold value has been exceeded by the updated rewards value; and communicating a balance to the user device, wherein the balance includes the rewards value and the value of the digital asset, wherein the user device is able to redeem the value of the digital asset, wherein a redemption of the reward by the user device is a real-time exchange of the digital asset to the digital wallet of the user device with a corresponding reward value in the rewards system based on the determination the threshold value has been exceeded.

20. The system of claim 19, wherein the digital asset is a cryptocurrency coin.

\* \* \* \* \*